(12) United States Patent
Elden

(10) Patent No.: US 11,912,326 B2
(45) Date of Patent: Feb. 27, 2024

(54) WHEELED CART WITH BRAKING SYSTEM

(71) Applicant: Richard Elden, Paramount, CA (US)

(72) Inventor: Richard Elden, Paramount, CA (US)

(73) Assignee: dbst products Inc., Carson, CA (US)

( * ) Notice: Subject to any disclaimer, the term of this patent is extended or adjusted under 35 U.S.C. 154(b) by 0 days.

(21) Appl. No.: 17/646,713

(22) Filed: Dec. 31, 2021

(65) Prior Publication Data
US 2023/0211819 A1 Jul. 6, 2023

(51) Int. Cl.
B62B 5/04 (2006.01)
B60T 1/00 (2006.01)
B60T 1/02 (2006.01)
F16D 63/00 (2006.01)

(52) U.S. Cl.
CPC ............ *B62B 5/0433* (2013.01); *B60T 1/005* (2013.01); *B62B 5/0461* (2013.01); *F16D 63/006* (2013.01); *B60T 1/02* (2013.01)

(58) Field of Classification Search
CPC .......... F16D 63/006; B60T 1/005; B60T 1/02; B62B 5/0433; B62B 5/0462; B62B 5/0461
USPC ..................................... 188/31; 280/651, 652
See application file for complete search history.

(56) References Cited

U.S. PATENT DOCUMENTS

| | | | | |
|---|---|---|---|---|
| 5,294,158 A | * | 3/1994 | Cheng ...................... | B62B 5/02 280/DIG. 4 |
| 5,765,665 A | * | 6/1998 | Cheng ..................... | B62B 9/087 188/31 |
| 5,884,982 A | * | 3/1999 | Yemini .................... | B60B 37/10 301/121 |
| D930,314 S | * | 9/2021 | Huang ........................... | D34/17 |
| 2005/0275195 A1 | * | 12/2005 | Matula ...................... | B62B 3/02 280/651 |
| 2012/0274052 A1 | * | 11/2012 | Zhu ......................... | B62B 3/027 280/651 |
| 2013/0320641 A1 | * | 12/2013 | Zhang ..................... | B62B 9/082 280/47.38 |
| 2020/0269898 A1 | * | 8/2020 | Frankel .................... | B62B 3/027 |

FOREIGN PATENT DOCUMENTS

| | | | | |
|---|---|---|---|---|
| DE | 202020102798 U1 | * | 7/2020 | ........... B62B 5/4061 |
| EP | 3318465 A1 | * | 5/2018 | ............... B62B 3/02 |
| GB | 2243198 A | * | 10/1991 | ............... B62B 5/04 |
| GB | 2349186 A | * | 10/2000 | ............. B62B 9/082 |

* cited by examiner

Primary Examiner — Thomas J Williams
(74) Attorney, Agent, or Firm — Orbit IP, LLP

(57) ABSTRACT

A wheeled cart includes a collapsible basket assembly configured to transport a variety of objects placed within. A brake lever arm is pivotably attached to the basket assembly and pivotable about a brake lever arm axis. A brake lever arm distal end is engaged by a user's foot to move between a released position and a braked position. The brake lever arm includes a brake feature. An inside face of a wheel includes a plurality of stops radially disposed about its axis. In the braked position the brake feature is configured to be positioned between at least two of the plurality of stops of the respective rear wheel thereby preventing rotation of the wheel. In the released position the brake feature is configured to be positioned outside the plurality of stops thereby allowing rotation of the wheel.

19 Claims, 17 Drawing Sheets

WHEELED CART WITH BRAKING SYSTEM

CROSS-REFERENCE TO RELATED APPLICATIONS

None

DESCRIPTION

Field of the Invention

The present invention generally relates to wheeled carts. More particularly, the present invention relates to a wheeled cart with a user selectable braking system.

Background of the Invention

Collapsible wheeled carts are very useful for a variety of tasks. The cart may be collapsed down to a slim profile such that it can be stored under objects such as beds or within objects such as the trunk of a car. Then, when the cart is needed, it can be expanded to form a usable basket that can store and transport a variety of heavy objects.

Collapsible wheeled carts can be utilized for trips to the supermarket to carry a shopper's food and produce from the market to their kitchen. The collapsible wheeled cart can be used to transport laundry, detergents, water bottles, groceries, sports equipment, outdoor camping gear or other heavy objects from one location to another.

However, once one arrives at a particular location, the cart may roll down any incline that is present. Keeping the cart in one location may prove difficult for older user's who need extra time moving to and from the cart. Therefore, a need exists for a simple way to lock the collapsible wheeled cart in one position while also being able to easily unlock it to move it to another location. The present invention fulfills these needs and provides other related advantages.

SUMMARY OF THE INVENTION

An embodiment of the present invention discloses a wheeled cart 10 comprising a basket assembly 12 configured to transport a variety of objects placed within. A left front wheel 14, a right front wheel 16, a left rear wheel 20 and a right rear wheel 30 are each rotatably attached to the basket assembly. The left rear wheel and the right rear wheel are aligned along a common rear axis 18. A left brake lever arm 21 is pivotably attached to the basket assembly and pivotable about a left brake lever arm axis 22. The left brake lever arm includes a left brake lever arm distal end 23 extending perpendicularly in relation to the left brake lever arm axis and is configured to be engaged with by a user's foot. The user's foot is configured to pivot the left brake lever arm by engaging the left brake lever arm distal end between a released position 40 and a braked position 41. The left brake lever arm includes a left brake feature 24. On an inside face 25 of the left rear wheel it includes a plurality of stops 26 radially disposed about the common rear axis. In the braked position the left brake feature is configured to be positioned between at least two of the plurality of stops of the left rear wheel preventing rotation of the left rear wheel. In the released position the left brake feature is configured to be positioned outside the plurality of stops allowing rotation of the left rear wheel. A right brake lever arm 31 is pivotably attached to the basket assembly and pivotable about a right brake lever arm axis 32. The right brake lever arm includes a right brake lever arm distal end 33 extending perpendicularly in relation to the right brake lever arm axis and is configured to be engaged with by the user's foot. The user's foot is configured to pivot the right brake lever arm by engaging the right brake lever arm distal end between the released position 40 to the braked position 41. The right brake lever arm includes a right brake feature 34. On an inside face 35 of the right rear wheel it includes a plurality of stops 36 radially disposed about the common rear axis. In the braked position the right brake feature is configured to be positioned between at least two of the plurality of stops of the right rear wheel preventing rotation of the right rear wheel. In the released position the right brake feature is configured to be positioned outside the plurality of stops allowing rotation of the right rear wheel.

In other exemplary embodiments, the left brake lever arm distal end may be attached to the right brake lever arm distal end by a connecting rod 42 extending therebetween.

In other exemplary embodiments, the basket assembly may be configured to collapse to a stored positioned 43 and expand to an opened position 44.

In other exemplary embodiments, when the basket assembly is in the opened position and all four wheels are on a ground level 45, the connecting rod may be positioned behind the common rear axis away from the front wheels, where the connecting rod in the released position is higher in relation to the connecting rod in the braked position.

In other exemplary embodiments, the left brake feature may comprise a left brake extension 27 extending outwardly from the left brake lever arm towards the left rear wheel in a direction parallel to the left brake lever arm axis.

In other exemplary embodiments, the right brake feature may comprise a right brake extension 37 extending outwardly from the right brake lever arm towards the right rear wheel in a direction parallel to the right brake lever arm axis.

In other exemplary embodiments, the left rear wheel may be not rotatably connected to the right rear wheel where the left rear wheel can rotate independent of the right rear wheel.

In other exemplary embodiments, the common rear axis may comprise a rear axle 46 attached to the basket assembly, where the left rear wheel is rotatably attached to a left end 47 of the rear axle and the right rear wheel is rotatably attached to a right end 48 of the rear axle.

In other exemplary embodiments, the left front wheel and the right front wheel may comprise swivel wheels 49.

In other exemplary embodiments, the left brake lever arm axis and the right brake lever arm axis may be parallel to the common rear axis.

In other exemplary embodiments, the left and right brake lever arms may be configured to remain in their respective braked positions or released positions until the user's foot moves them to the other positions.

In other exemplary embodiments, the basket assembly may comprise a rectangular floor 60 defining a front edge 61, a rear edge 62, a left edge 63 and a right edge 64, wherein a front wall 71 is pivotably connected to the front edge of the rectangular floor, and wherein a back wall 72 is pivotably connected to the rear edge of the rectangular floor.

In other exemplary embodiments, wherein in the opened position the front wall and rear wall may be perpendicular in relation to the rectangular floor, and wherein in the stored position the front wall may be aligned with the rectangular floor and the back wall may be adjacent to the rectangular floor.

In other exemplary embodiments, the basket assembly may comprise a left wall 73 pivotably connected at one end to the front wall and pivotably connected at another end to the rear wall, wherein the left wall comprises a first plurality of individual struts.

In other exemplary embodiments, the basket assembly may comprise a right wall 74 pivotably connected at one end to the front wall and pivotably connected at another end to the rear wall, wherein the right wall comprises a second plurality of individual struts.

In other exemplary embodiments, the basket assembly may comprise a U-shaped handle 80 having a middle portion 81 connecting to a left extension 82 and a right extension 83.

In other exemplary embodiments, a left strut 84 may be pivotably connected at one end to a distal end 85 of the left extension and connected at another end to the left edge of the rectangular floor, and wherein the left extension is pivotably connected to the left wall.

In other exemplary embodiments, a right strut 86 may be pivotably connected at one end to a distal end 87 of the right extension and connected at another end to the right edge of the rectangular floor, and wherein the right extension is pivotably connected to the right wall.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 9:
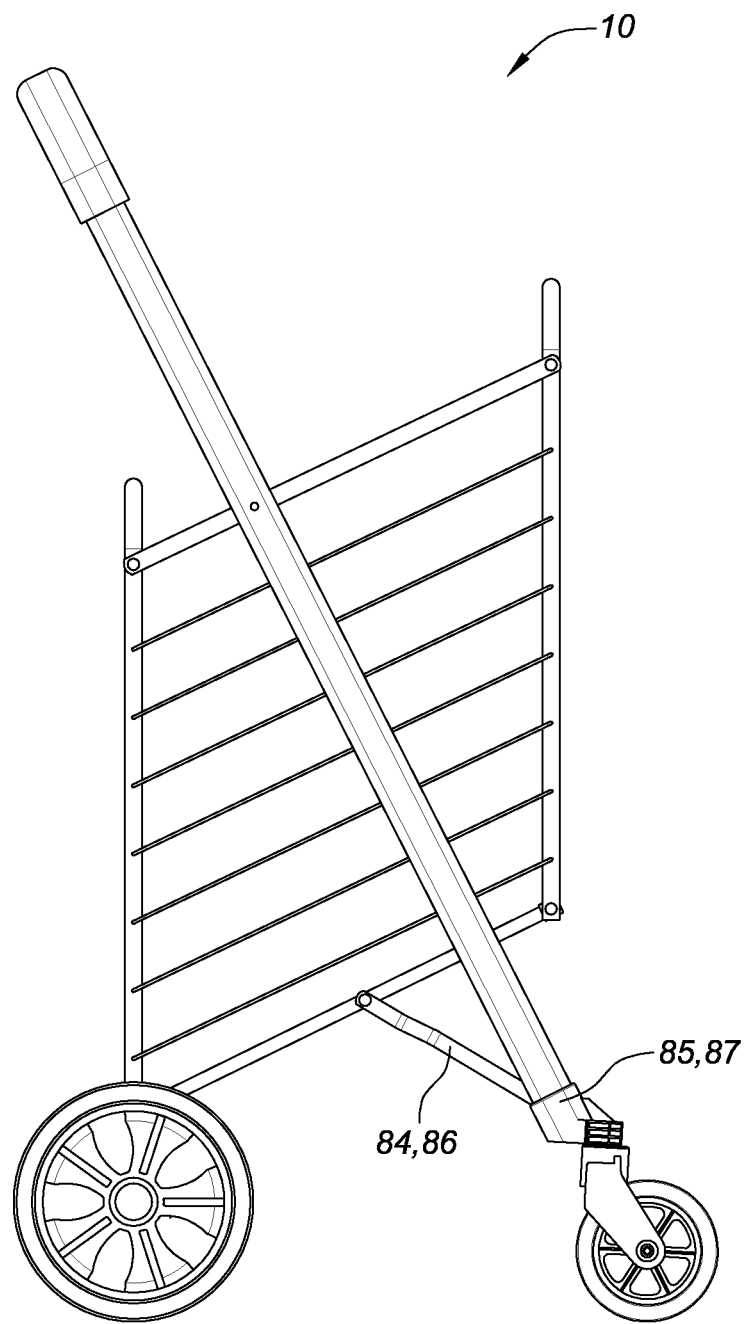
FIG. 9 is a left perspective view of the structure of FIG. 1 now showing the wheeled cart halfway between a stored position and an opened position.
Figure 10:
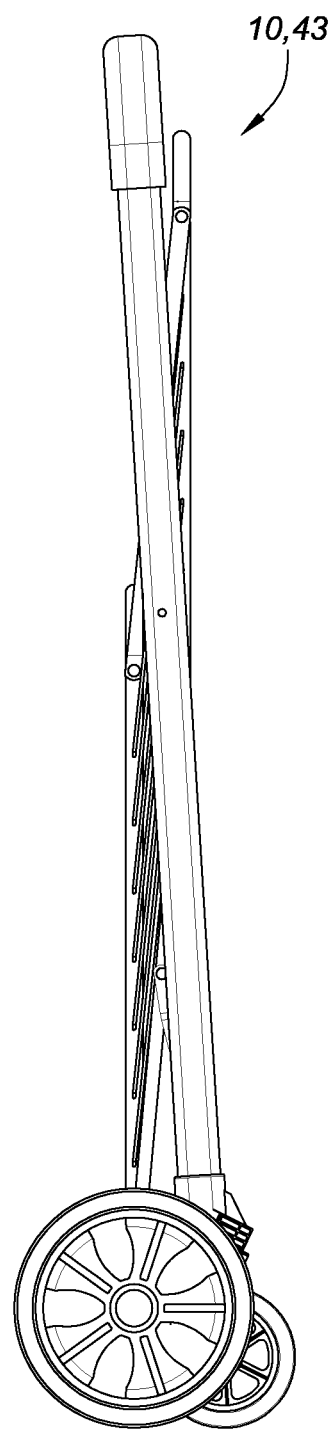
FIG. 10 is a left perspective view of the structure of FIG. 1 now showing the wheeled cart in the stored position.
Figure 11:
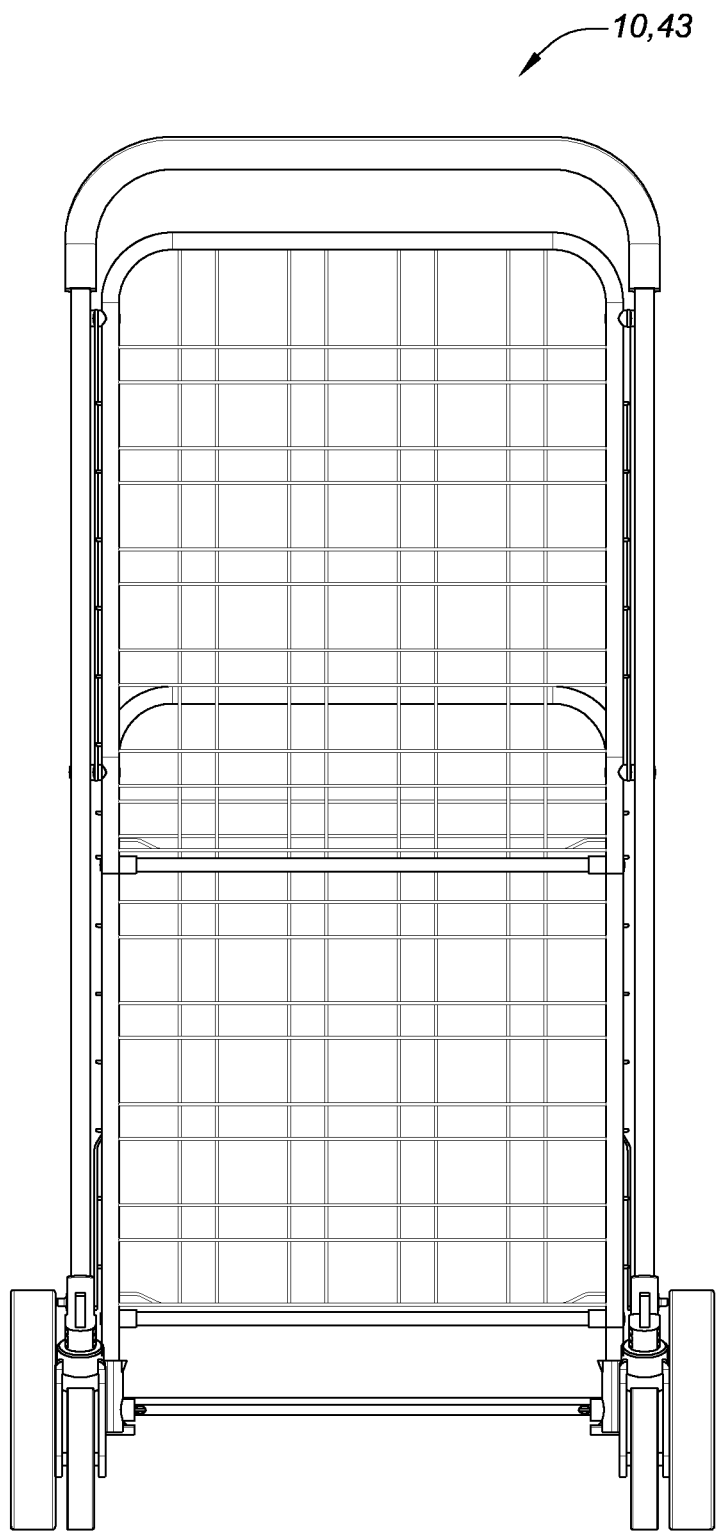
FIG. 11 is a front perspective view of the structure of FIG. 10.
Figure 12:
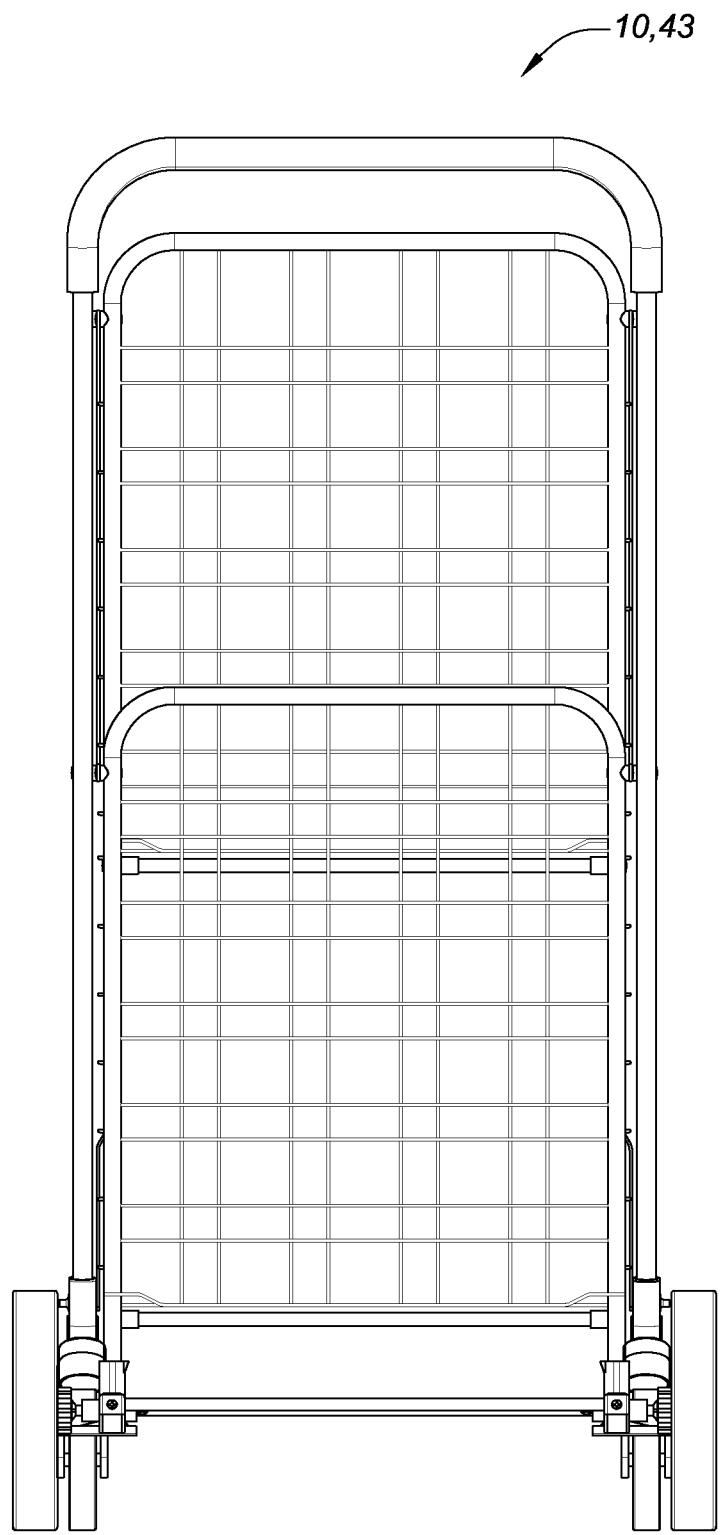
FIG. 12 is a rear perspective view of the structure of FIG. 10.
Figure 13:
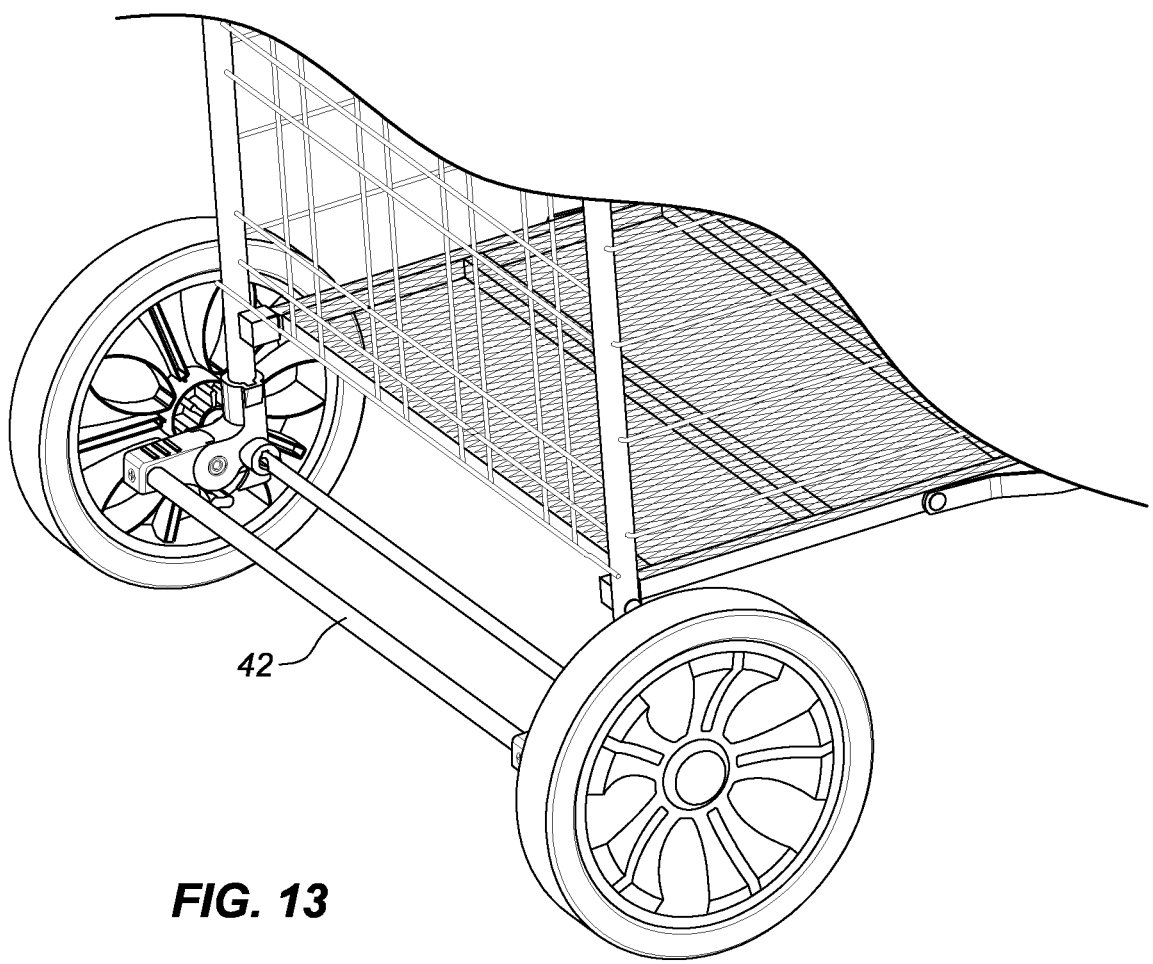
FIG. 13 is an enlarged perspective view of the structure of FIG. 1 now showing the rear wheels.

FIGS. 1-8 illustrate a wheeled cart 10 of the present invention in an opened position 44. The wheeled cart has a basket assembly 12 (i.e. bucket or compartment) that is configured to transport a variety of objects placed within. The wheeled cart is collapsible meaning that it can collapse down to a smaller overall size for storage or transportation. FIG. 9 shows the wheeled cart during a transition from the opened position 44 to then a stored position 43 as shown in FIGS. 10-12.

The wheeled cart has four wheels being a left front wheel 14, a right front wheel 16, a left rear wheel 20 and a right rear wheel 30. Each wheel is rotatably attached to the basket assembly. The left rear wheel and the right rear wheel are aligned along a common rear axis 18. Yet, the left rear wheel is not rotatably connected to the right rear wheel such that the left rear wheel can rotate independent of the right rear wheel.

To the contrary, the left front wheel and the right front wheel comprise swivel wheels 49. A swivel wheel is understood by those skilled in the art, in that the wheel is able to rotate about a horizontal axis such that the wheel rolls upon a surface but the wheel assembly is also able to rotate about a vertical axis that is disposed ahead of the wheel axis, such that when the cart is moved the swivel wheel always tracks straight into the path the cart is being pushed. Most grocery carts used today use swivel wheels as the front wheels such that those skilled in the art are familiar with their use.

Figure 21:
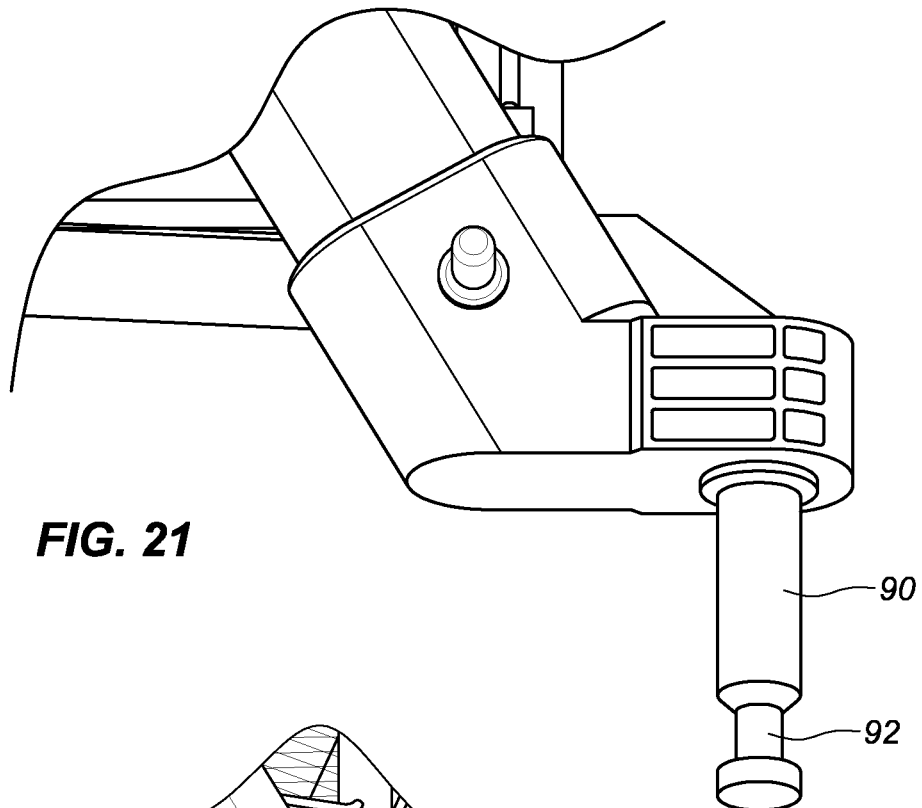
FIG. 21 is an enlarged perspective view of the front swivel post before a wheel is attached.
Figure 22:
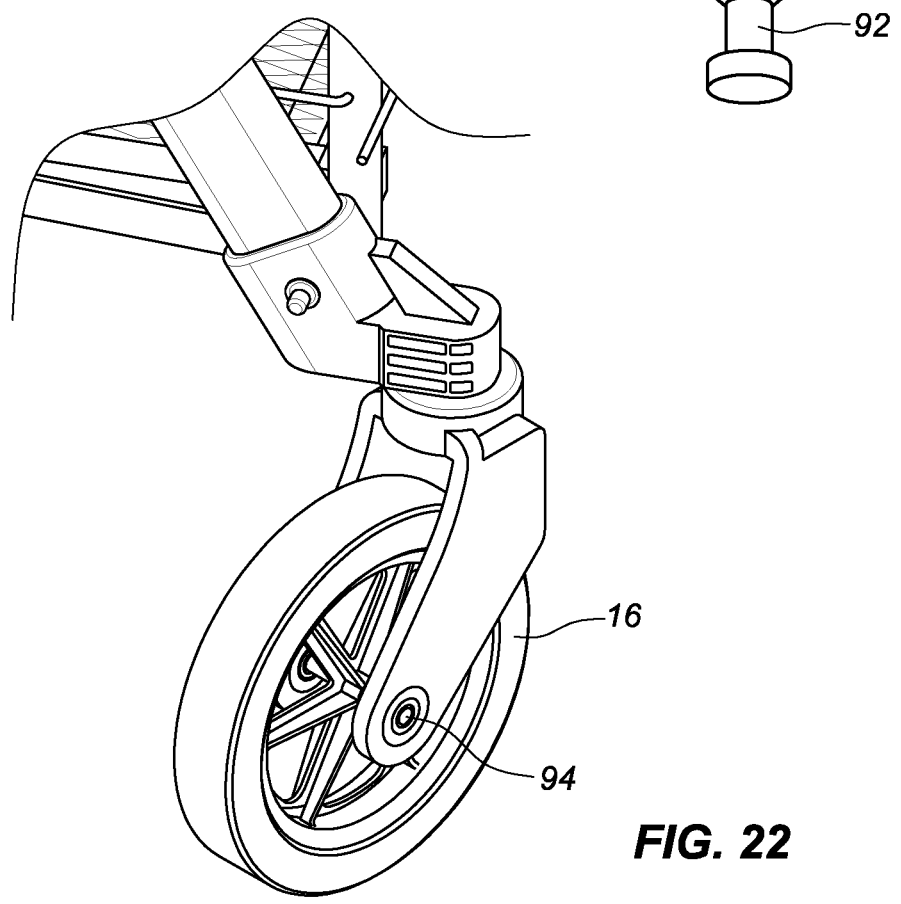
FIG. 22 is an enlarged perspective view of the front swivel post of FIG. 21 now with a wheel attached.

More specifically, FIG. 21 is an enlarged perspective view of the front swivel post 90 before a front wheel is attached. FIG. 22 is an enlarged perspective view of the front swivel post 90 of FIG. 21 now with a front wheel attached. When the wheeled cart 10 is in use, the front swivel post is vertically disposed and acts as an axis that the front wheels 14, 16 can rotate about. As previously mentioned, the actual axis of (horizontal) rotation 94 of each front wheel is not aligned vertically with the front swivel post 90 but is instead disposed a distance behind it. Due to the distance differential, the front swivel wheels will rotate about the post 90 such that the front wheels 14, 16 always track in the same direction as the wheeled cart is being pushed.

During shipping of the product of the present invention, the front wheels 14, 16 are not attached to the front swivel post 90. As can be seen, the front swivel post 90 has an annular channel 92 formed around it. The front wheels are configured to either removably or permanently attach to the front swivel post by simply being pushed onto the swivel post. A spring-loaded capture mechanism is disposed within the front wheel such that it engages with the annular channel 92 for a secure connection. The spring-loaded capture mechanism allows for a quick connect feature speeding up assembly of the product by the end user. As will be understood by those skilled in the art, many forms of spring-loaded capture mechanisms can be devised to engage with the annular channel 92, as this teaching is not meant to limit the disclosure to any one specific configuration.

Figure 15:
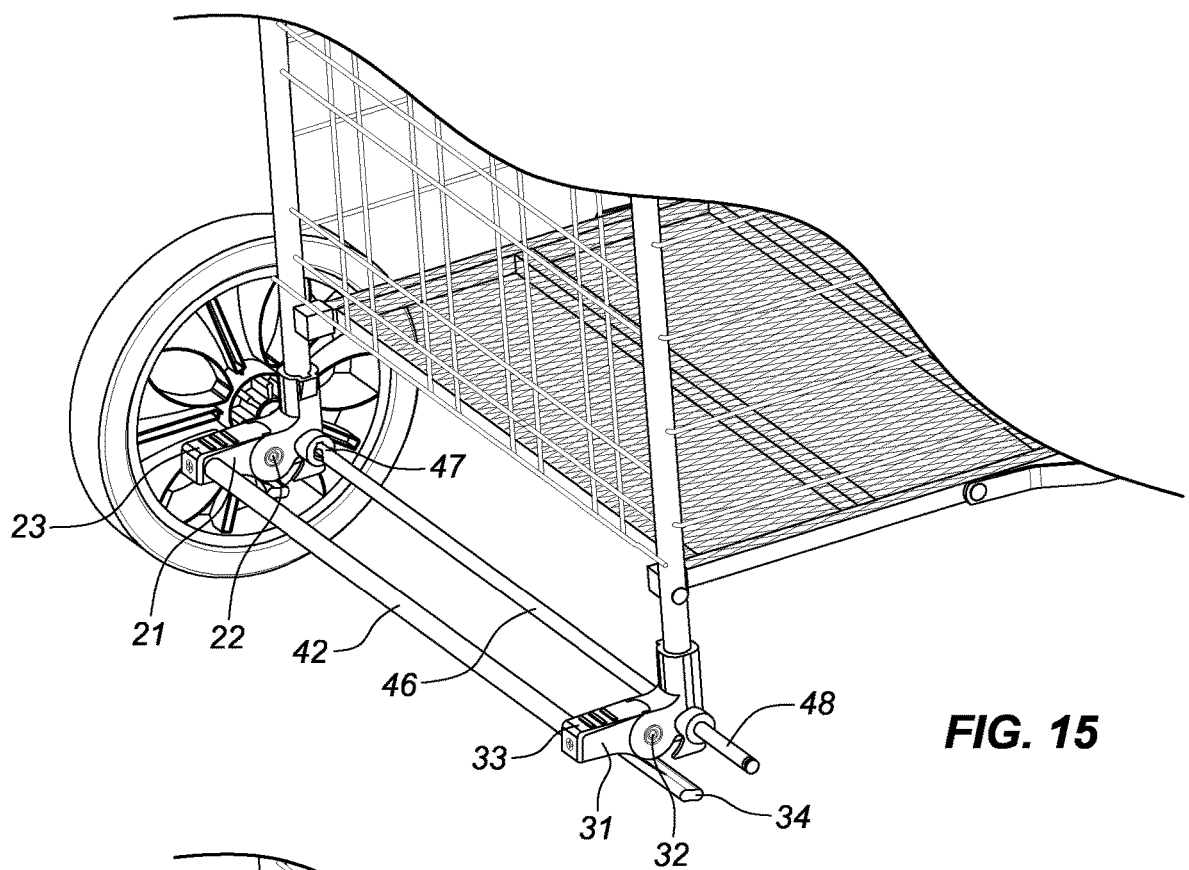
FIG. 15 is a perspective view similar to view 13 now showing the right rear wheel removed and the brake assembly in the released position.
Figure 16:
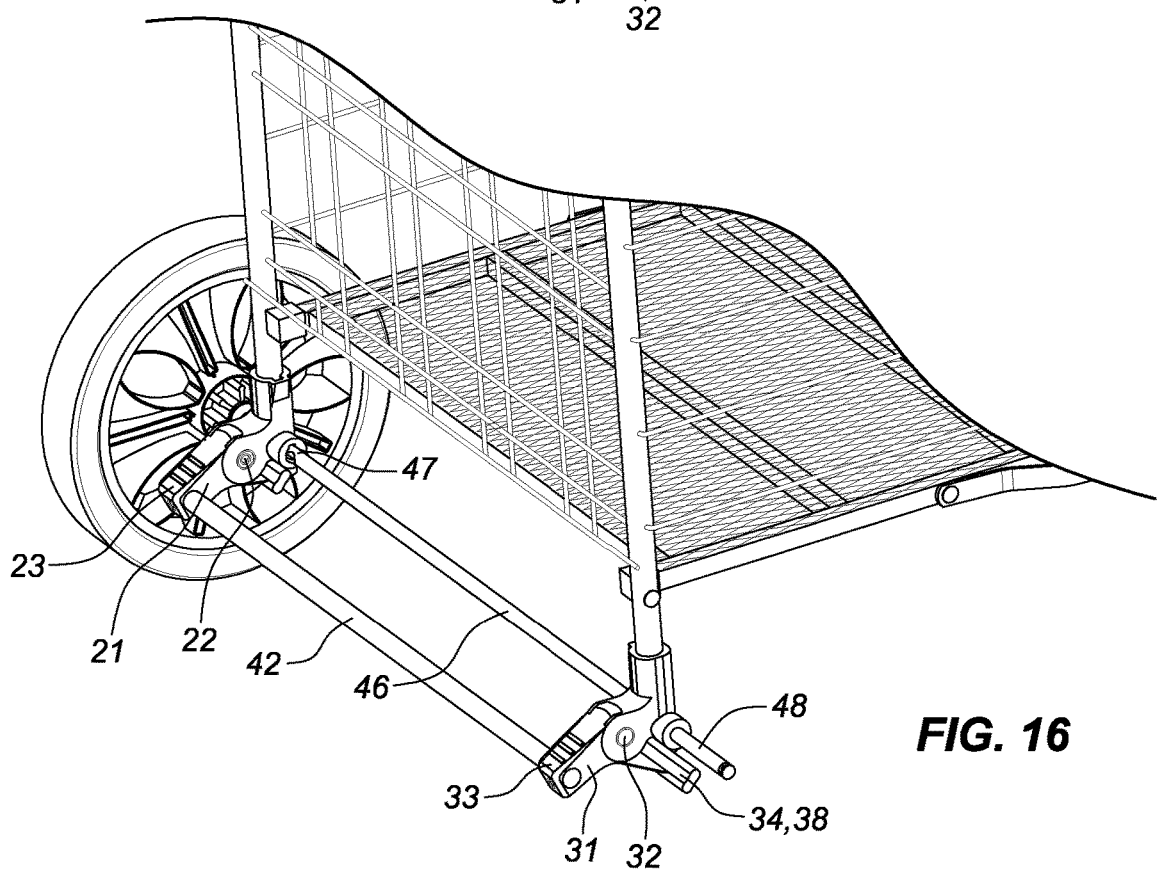
FIG. 16 is a perspective view of the structure of FIG. 15 now showing the brake assembly in the braked position.
Figure 17:
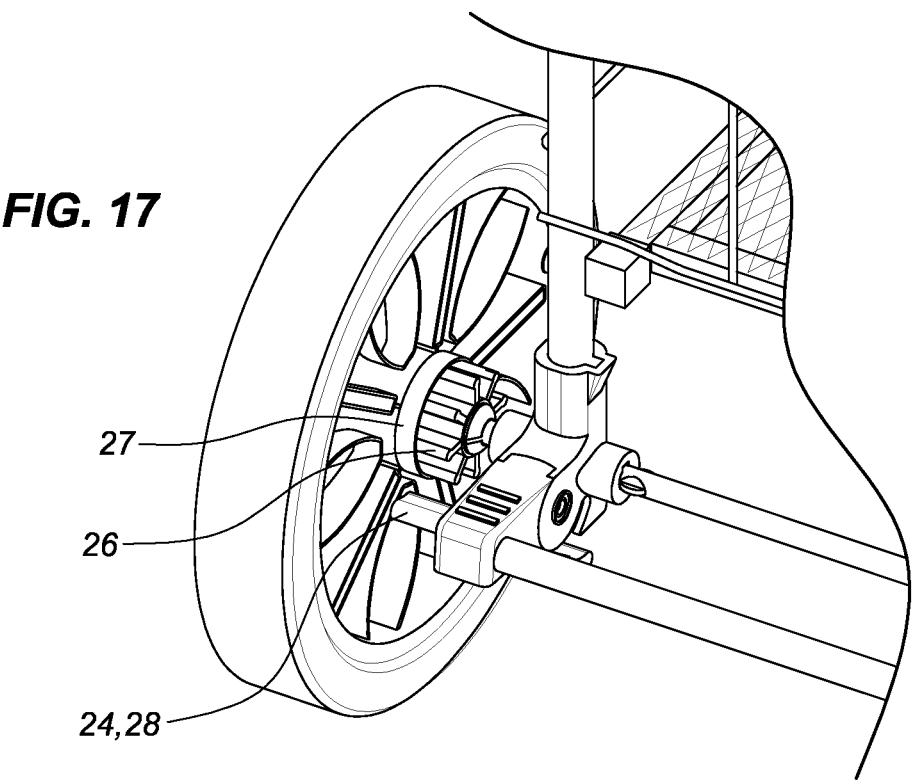
FIG. 17 is an enlarged perspective view of the structure of FIG. 1 now showing the brake assembly in the released position.
Figure 18:
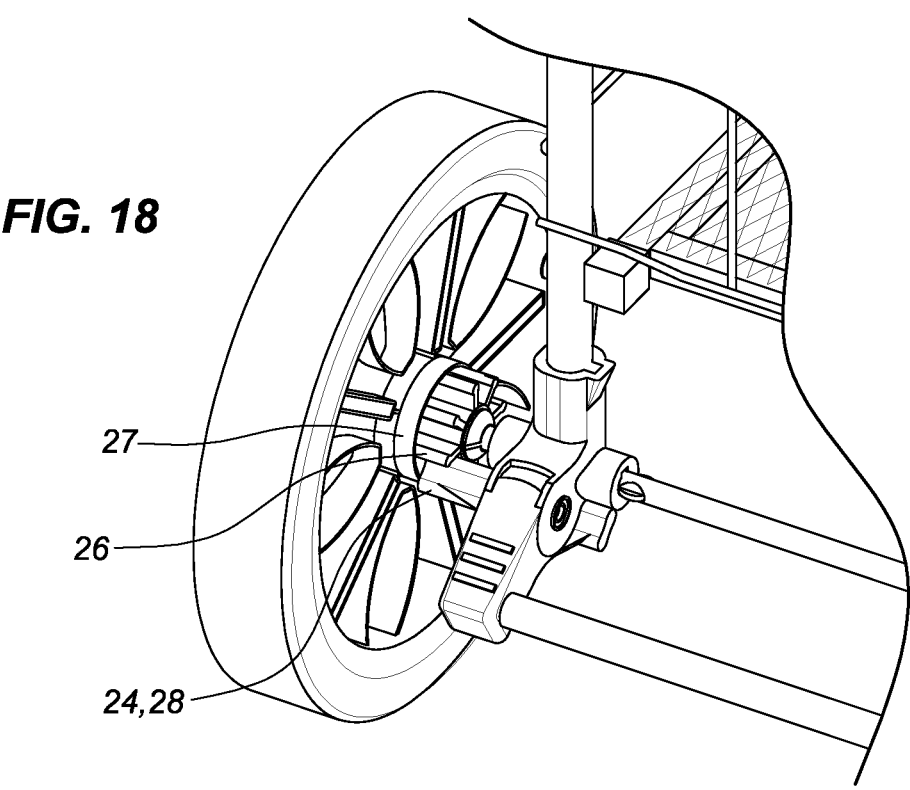
FIG. 18 is a perspective view similar to FIG. 17 now showing the brake assembly in the braked position.

Referring now to FIGS. 15-16 which have the right rear wheel removed, a right brake lever arm 31 is pivotably attached to the basket assembly and pivotable about a right brake lever arm axis 32. The right brake lever arm includes a right brake lever arm distal end 33 extending perpendicularly in relation to the right brake lever arm axis. The right brake lever arm distal end is configured to be engaged with by a user's foot. The user's foot is able to step downward or upward to pivot the right brake lever arm by engaging the right brake lever arm distal end between a released position 40 as shown in FIG. 15 to the braked position 41 as shown in FIG. 16. To accomplish the means of braking, the right brake lever arm includes a right brake feature 34 that is configured to engage the right rear wheel in a locking manner.

Similarly for the left side, a left brake lever arm 21 is pivotably attached to the basket assembly and pivotable about a left brake lever arm axis 22. The left brake lever arm includes a left brake lever arm distal end 23 extending perpendicularly in relation to the left brake lever arm axis and is configured to be engaged with by a user's foot. The user's foot is configured to pivot the left brake lever arm by engaging the left brake lever arm distal end between the released position 40 and the braked position 41. Similarly, to accomplish the means of braking the left brake lever arm includes a left brake feature 24 that is also configured to engage the left rear wheel in a locking manner.

Figure 14:
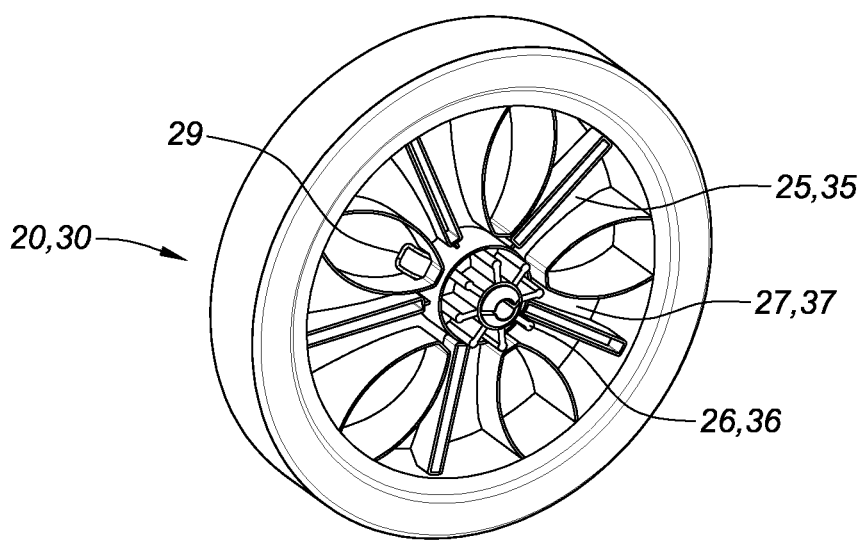
FIG. 14 is a perspective view showing an inside surface of a rear wheel of the structure of FIG. 1.

Referring now to FIG. 14, which may be illustrating either the left or right rear wheel, on an inside face 25 of the left rear wheel it includes a plurality of stops 26 radially disposed about the common rear axis. Similarly, on an inside face 35 of the right rear wheel it includes a plurality of stops 36 radially disposed about the common rear axis. The plurality of stops can be formed in a multitude of shapes and sizes. In this embodiment there are eight stops that extend outwardly from the inside face of the wheel. It is understood that 3, 4, 5, 6, 7, 8 or any number of stops could be utilized that is consistent with this teaching. This then creates a plurality of pockets 27, 37 (i.e. receivers, gaps, holes) that the brake features 24, 34 can fit within. Thus, in the braked position the left and right brake features are configured to be positioned between at least two of their respective plurality of stops thereby preventing rotation of the left and right rear wheels. Accordingly, in the released position the left and right brake features are configured to be positioned outside their respective plurality of stops allowing rotation of the left and right rear wheels. Also shown is a release pin 29 that is used to attach the wheels to the rear axle ends 47, 48, and which can be depressed to then release the wheels after they were installed onto the rear axle ends 47, 48.

It will be understood that the right brake feature can take many shapes and sizes. Here, the right brake feature is in the form a right brake extension 38 extending outwardly from the right brake lever arm towards the right rear wheel in a direction parallel to the right brake lever arm axis. Likewise, the left brake feature comprises a left brake extension 28 extending outwardly from the left brake lever arm towards the left rear wheel in a direction parallel to the left brake lever arm axis.

It is understood that each braking assembly for the right and left sides may be operated independently. However, in this embodiment the left brake lever arm distal end is attached to the right brake lever arm distal end by a connecting rod 42 extending therebetween. The connecting rod makes it easy for one foot operation to then engage both the left and right braking assemblies.

When the basket assembly is in the opened position and all four wheels are on a ground level 45, the connecting rod is positioned behind the common rear axis away from the front wheels, where the connecting rod in the released position is higher in relation to the connecting rod in the braked position. This is intuitive for the user, such that pressing down on the connecting rod locks the brakes, whereas lifting up on the connecting rod releases the brakes.

The common rear axis 18 in this embodiment is a rear axle 46 attached to the basket assembly. The left rear wheel is rotatably attached to a left end 47 of the rear axle and the right rear wheel is rotatably attached to a right end 48 of the rear axle. However, it will be understood by those skilled in the art that the use of a rear axle is not necessary. The rear axle is used herein to help stabilize the structural rigidity of the overall wheeled cart 10.

As shown in this embodiment, the left brake lever arm axis and the right brake lever arm axis are parallel to the common rear axis. Alternatively, it will also be understood that the left and right brake lever arm axes 22, 32 could have been aligned with the common rear axis 18, i.e. the rear axle 46.

Figure 19:
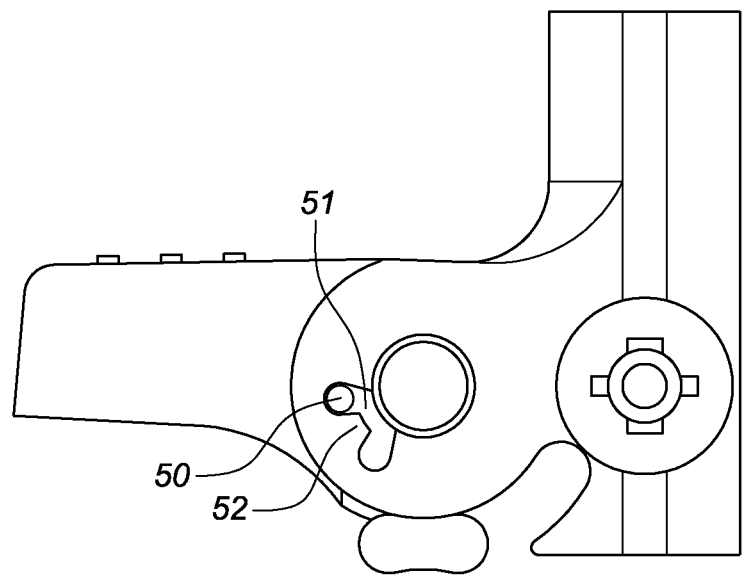
FIG. 19 is an enlarged perspective view of the right axle end of FIG. 15.
Figure 20:
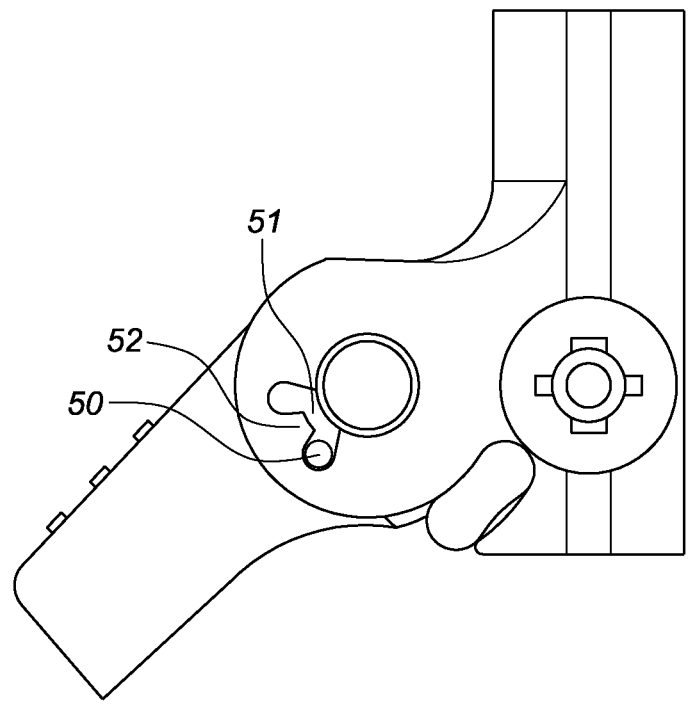
FIG. 20 is an enlarged perspective view of the right axle end of FIG. 16.

It would be detrimental to the user experience if the brakes did not stay into their desired released or braked position. Therefore, the left and right brake lever arms are configured to remain in their respective braked positions or released positions until the user's foot moves them to the other positions. As best shown in FIGS. 19 and 20, this is accomplished with a raised bump 50 that is disposed within a slot 51. In either the released position (FIG. 19) or braked position (FIG. 20) the raised bump is disposed within the slot 51. Yet, when moving between the released and braked positions, the raised bump is forced into abutting engagement with the flexural piece of material 52. The flexural piece of material 52 flexes (i.e. bends) a small distance out of the way to allow the bump to pass thereby. This bump and slot feature may be repeated on both sides of each brake assembly. Furthermore, this bump and slot feature may be disposed on both the left and right sides. It will also be understood that a variety of comparable features that accomplish the same goal or retaining their respective brakes in the desired released or braked position may be used herein, as this teaching is not intended to limit it to the precise form shown and described herein.

Figure 1:
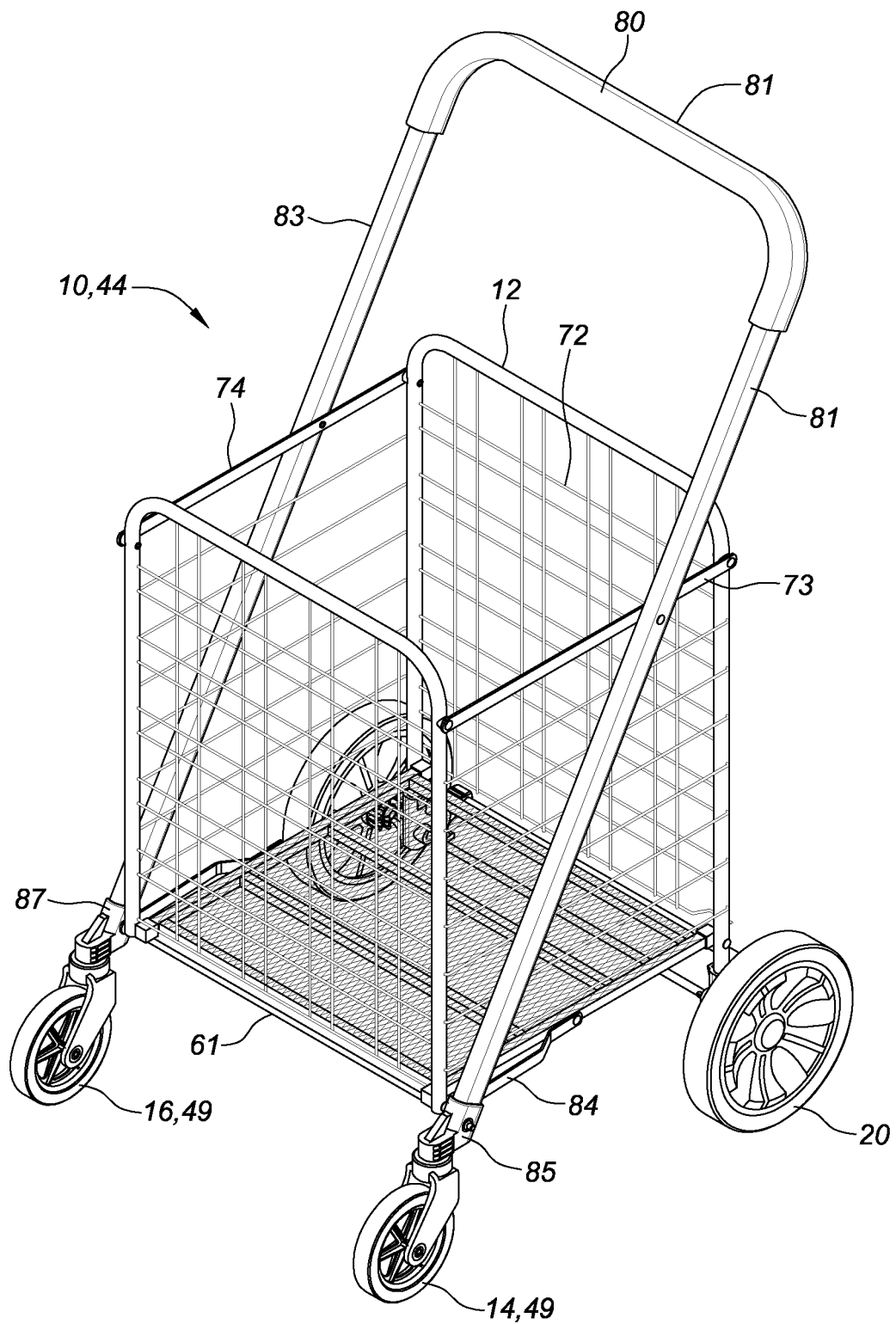
FIG. 1 is a perspective view of an embodiment of a wheeled cart of the present invention.
Figure 2:
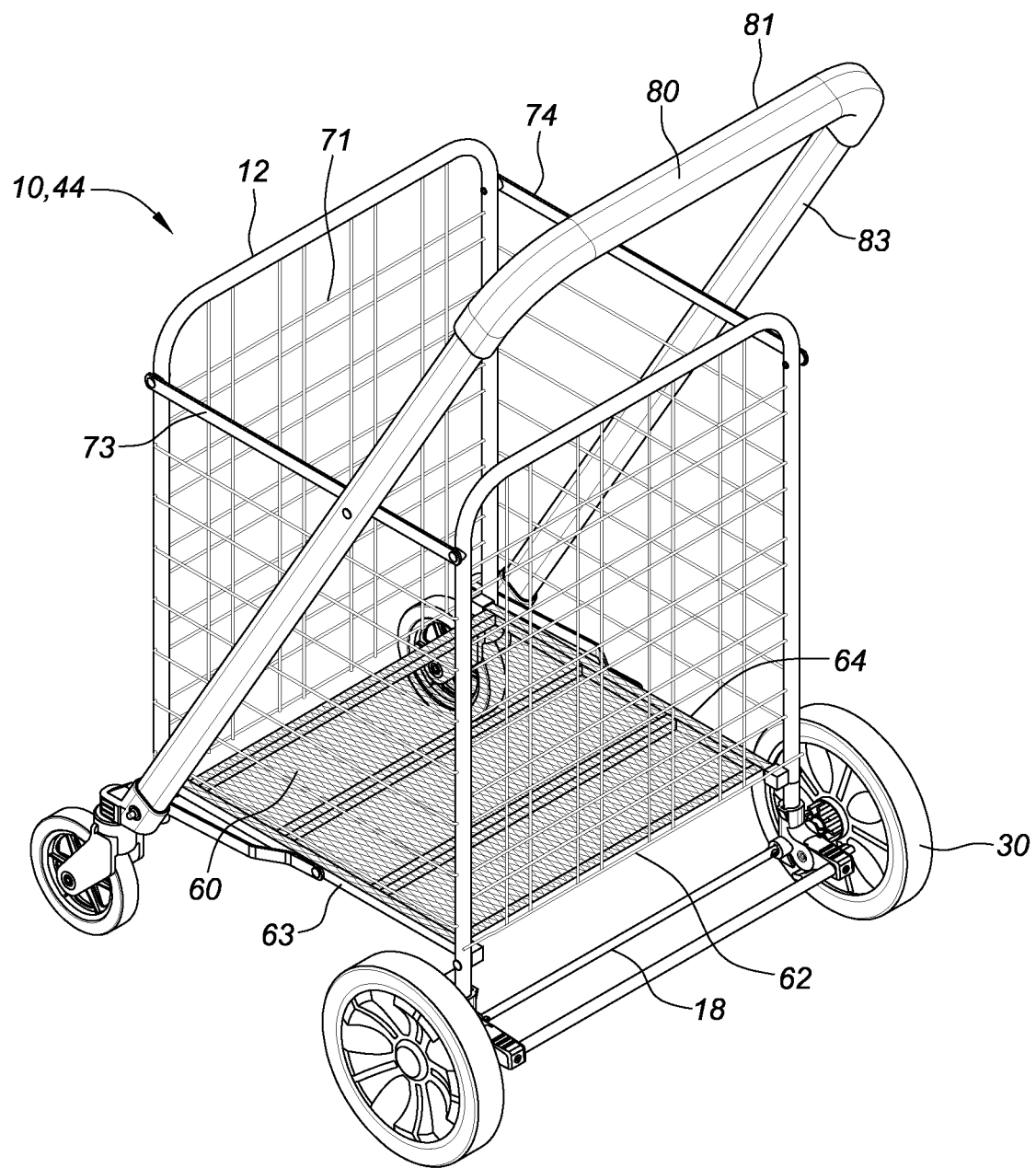
FIG. 2 is another perspective view of the structure of FIG. 1.
Figure 3:
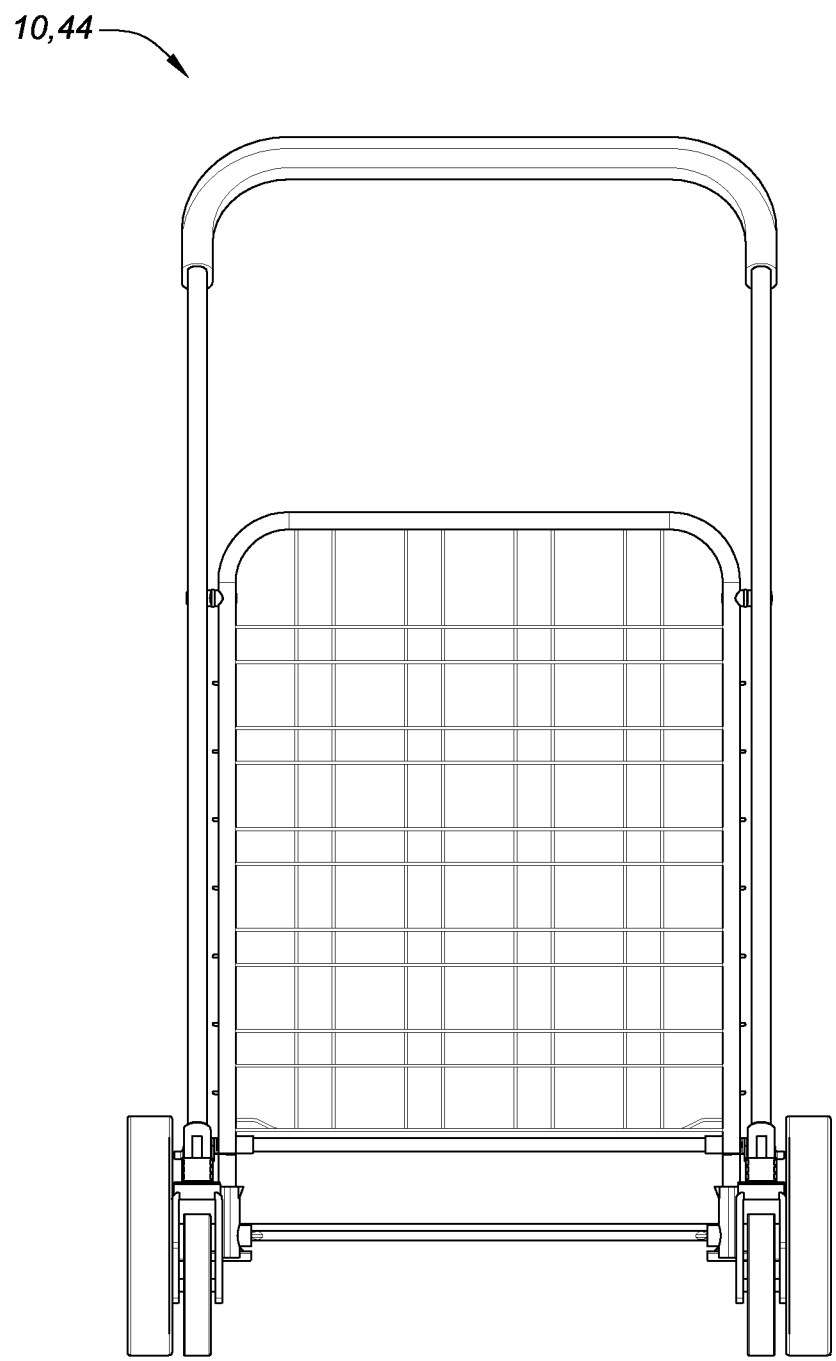
FIG. 3 is a front perspective view of the structure of FIG. 1.
Figure 4:
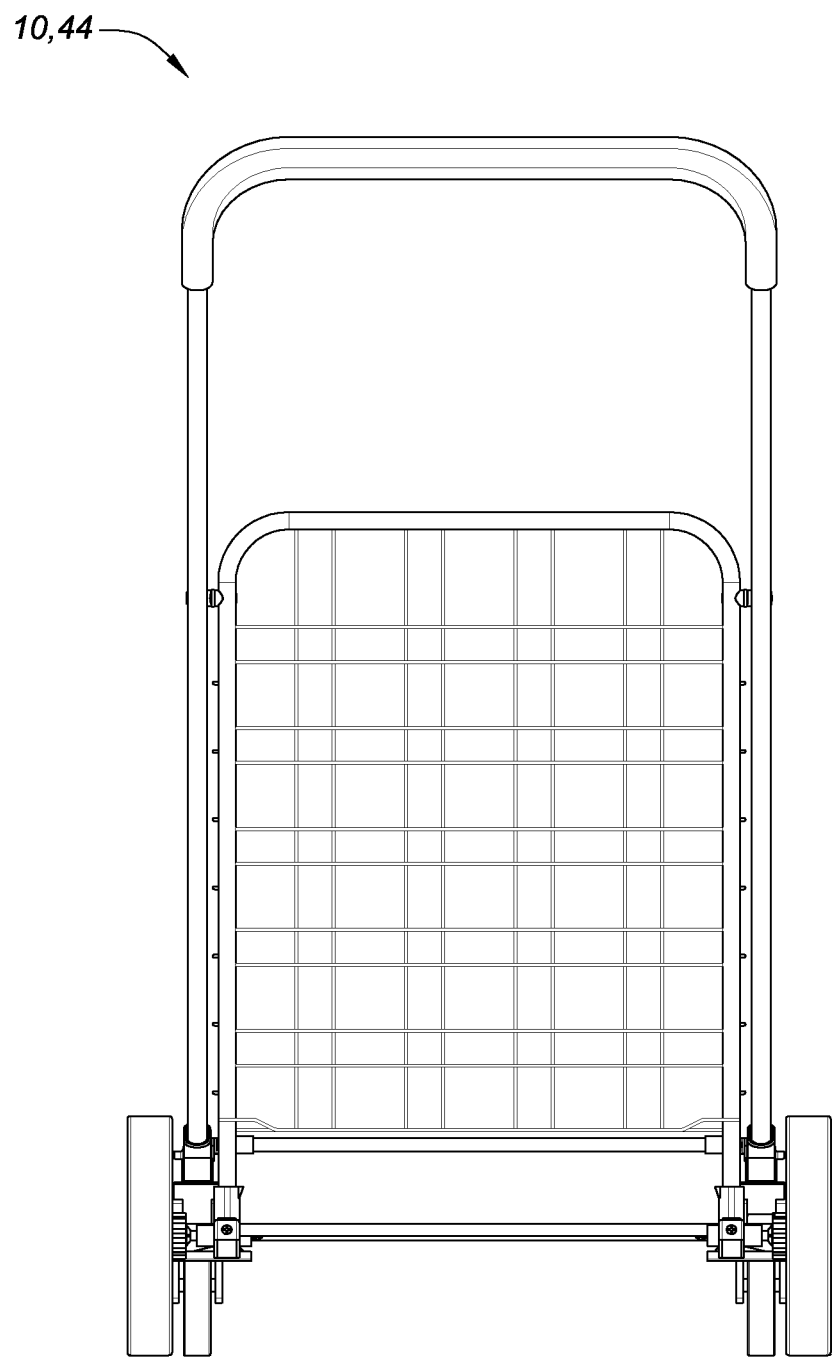
FIG. 4 is a rear perspective view of the structure of FIG. 1.
Figure 5:
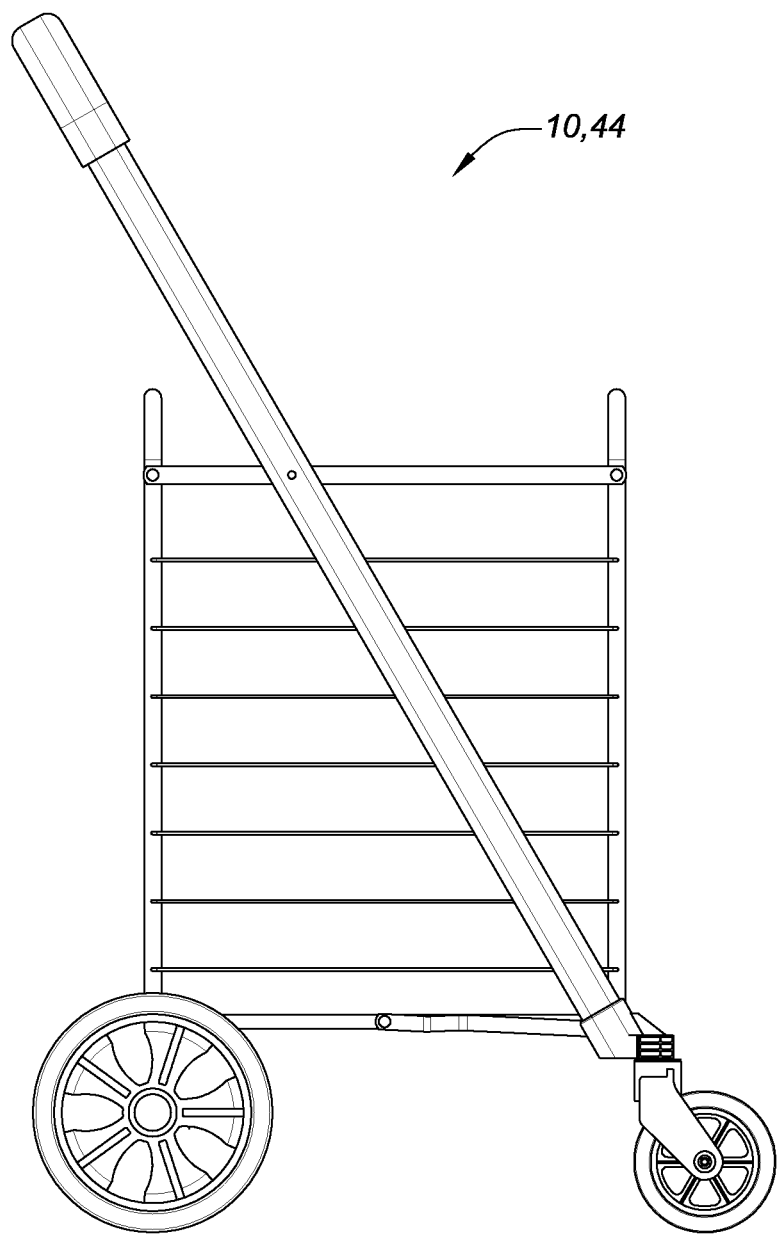
FIG. 5 is a left side perspective view of the structure of FIG. 1.
Figure 6:
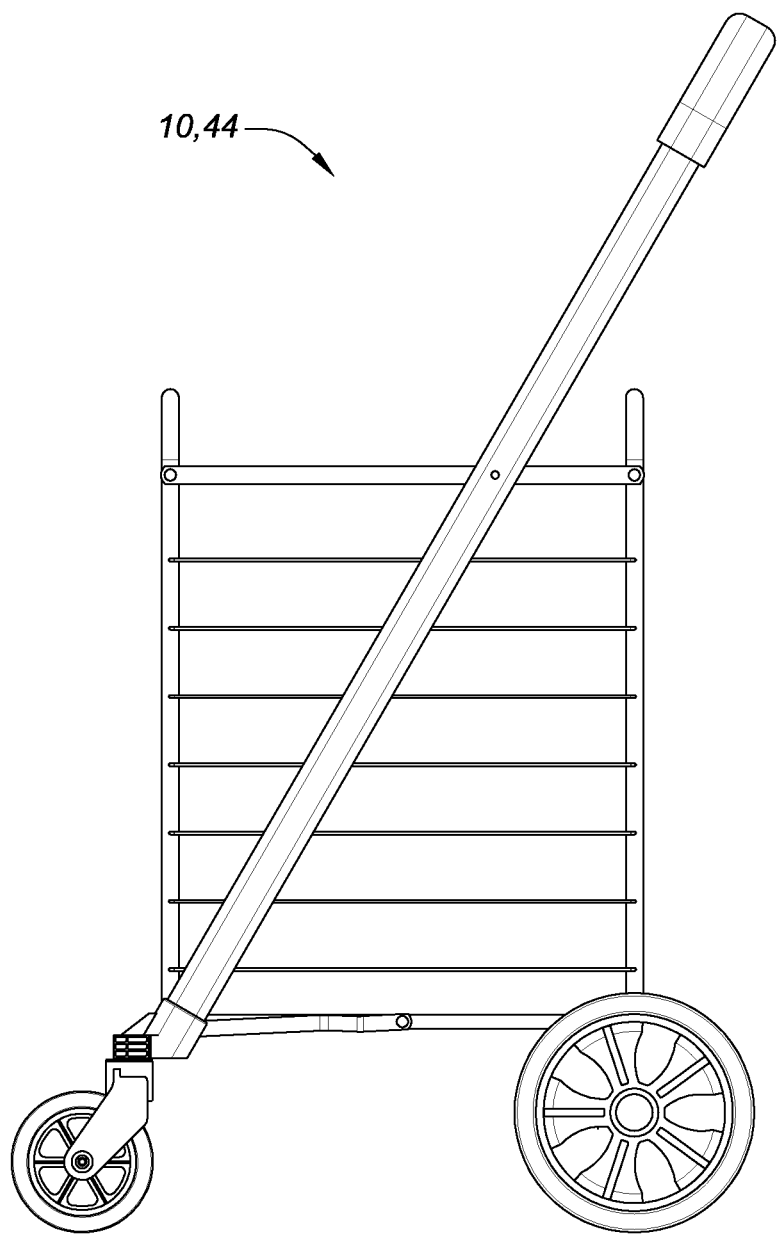
FIG. 6 is a right side perspective view of the structure of FIG. 1.
Figure 7:
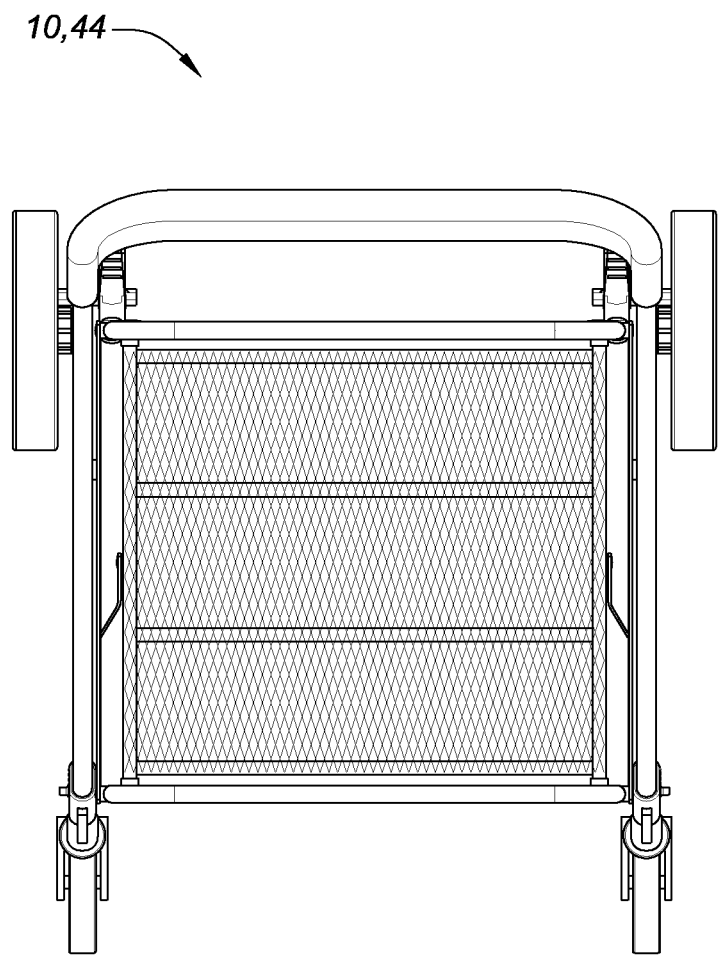
FIG. 7 is a top perspective view of the structure of FIG. 1.
Figure 8:
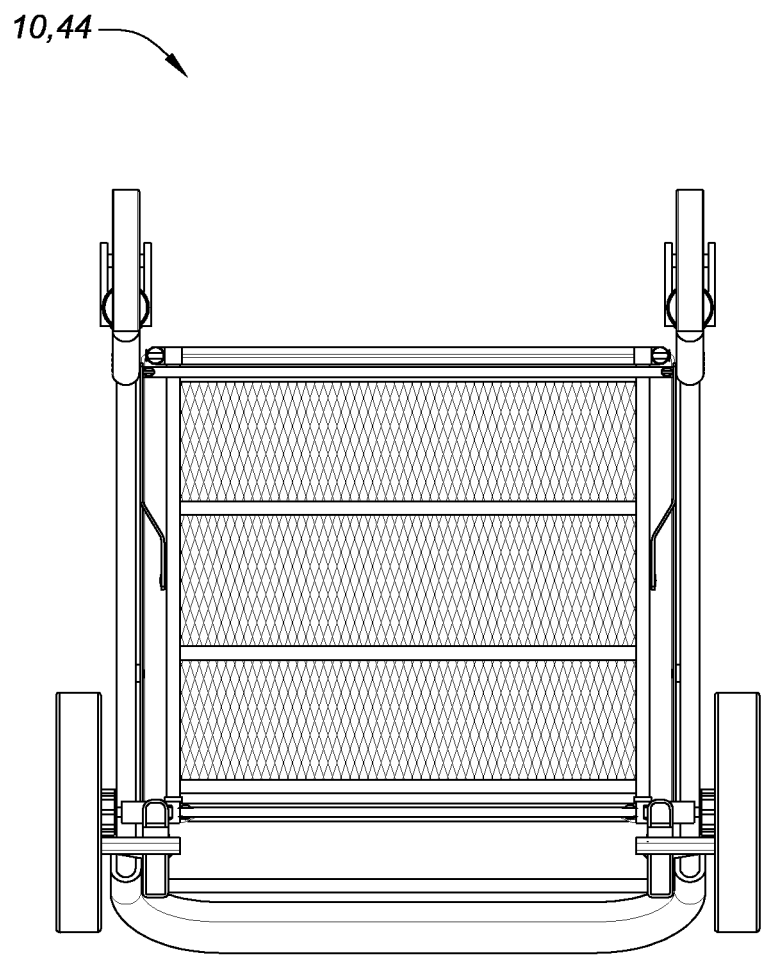
FIG. 8 is a bottom perspective view of the structure of FIG. 1.

As previously taught herein, the wheeled cart 10 is collapsible. To facilitate this capability, the basket assembly comprises a rectangular floor 60 defining a front edge 61, a rear edge 62, a left edge 63 and a right edge 64 which is best seen in FIGS. 1 and 2. A front wall 71 is pivotably connected to the front edge of the rectangular floor. A back wall 72 is also pivotably connected to the rear edge of the rectangular floor. In the opened position the front wall and rear wall are perpendicular in relation to the rectangular floor. Then, as shown in FIGS. 1-12, in the stored position the front wall is aligned with the rectangular floor and the back wall is adjacent to the rectangular floor.

To create sidewalls, the basket assembly comprises a left wall 73 that is pivotably connected at one end to the front wall and pivotably connected at another end to the rear wall. The left wall comprises a first plurality of individual struts, such that when folded, the plurality of struts can reduce in shape along with the rest of the basket assembly. Likewise, the basket assembly comprises a right wall 74 pivotably connected at one end to the front wall and pivotably connected at another end to the rear wall. The right wall comprises a second plurality of individual struts.

The basket assembly comprises a U-shaped handle 80 having a middle portion 81 connecting to a left extension 82 and a right extension 83. As best seen in FIG. 9, a left strut 84 is pivotably connected at one end to a distal end 85 of the left extension and connected at another end to the left edge of the rectangular floor, and wherein the left extension is pivotably connected to the left wall. A right strut 86 is pivotably connected at one end to a distal end 87 of the right extension and connected at another end to the right edge of the rectangular floor, and wherein the right extension is pivotably connected to the right wall.

Although several embodiments have been described in detail for purposes of illustration, various modifications may be made to each without departing from the scope and spirit of the invention. Accordingly, the invention is not to be limited, except as by the appended claims.

REFERENCE NUMERALS 10 wheeled cart
12 basket assembly
14 left front wheel
16 right front wheel
18 common rear axis
20 left rear wheel
21 left brake lever arm
22 left brake lever arm axis
23 left brake lever arm distal end
24 left brake feature
25 inside face, left rear wheel
26 plurality of stops, left rear wheel
27 plurality of pockets, left rear wheel
28 left brake extension
29 release pin
30 right rear wheel
31 right brake lever arm
32 right brake lever arm axis
33 right brake lever arm distal end
34 right brake feature
35 inside face, right rear wheel
36 plurality of stops, right rear wheel
37 plurality of pockets, right rear wheel
38 right brake extension
40 released position
41 braked position
42 connecting rod
43 stored position
44 opened position
45 ground level
46 rear axle
47 left end, rear axle
48 right end, rear axle
50 bump
51 slot
52 flexural piece of material
60 rectangular floor
61 front edge, rectangular floor
62 rear edge, rectangular floor
63 left edge, rectangular floor
64 right edge, rectangular floor
71 front wall
72 back wall
73 left wall
74 right wall
80 U-shaped handle
81 middle portion, U-shaped handle
82 left extension, U-shaped handle
83 right extension, U-shaped handle
84 left strut
85 distal end, U-shaped handle, left extension
86 right strut
87 distal end, U-shaped handle, right extension
90 front swivel post, vertical axis of rotation
92 annular channel, front swivel post
94 axis of rotation, horizontal axis, swivel wheel

What is claimed is:

1. A wheeled cart, comprising:
a basket assembly configured to transport a variety of objects placed within;
a left front wheel, a right front wheel, a left rear wheel and a right rear wheel each rotatably attached to the basket assembly, wherein the left rear wheel and the right rear wheel are aligned along a common rear axis;
a left brake lever arm pivotably attached to the basket assembly and pivotable about a left brake lever arm axis, wherein the left brake lever arm includes a left brake lever arm distal end extending perpendicularly in relation to the left brake lever arm axis, wherein the left brake lever arm is configured to pivot by engaging the left brake lever arm distal end between a released position and a braked position, wherein the left brake lever arm includes a left brake feature;
wherein on an inside face of the left rear wheel includes a plurality of stops radially disposed about the common rear axis;
wherein in the braked position the left brake feature is configured to be positioned between at least two of the plurality of stops of the left rear wheel preventing rotation of the left rear wheel;
wherein in the released position the left brake feature is configured to be positioned outside the plurality of stops allowing rotation of the left rear wheel;
a right brake lever arm pivotably attached to the basket assembly and pivotable about a right brake lever arm axis, wherein the right brake lever arm includes a right brake lever arm distal end extending perpendicularly in relation to the right brake lever arm axis, wherein the right brake lever arm is configured to pivot by engaging the right brake lever arm distal end between the released position to the braked position, wherein the right brake lever arm includes a right brake feature;
wherein on an inside face of the right rear wheel includes a plurality of stops radially disposed about the common rear axis;
wherein in the braked position the right brake feature is configured to be positioned between at least two of the plurality of stops of the right rear wheel preventing rotation of the right rear wheel; and
wherein in the released position the right brake feature is configured to be positioned outside the plurality of stops allowing rotation of the right rear wheel;
wherein the left brake lever arm includes a left side raised bump and wherein the basket assembly includes a left side flexure formed by a left side elongated slot, the left side elongated slot extending from a left side first slot end to a left side second slot end, the left side flexure at least partially extending towards the left brake lever arm axis;
wherein the left side raised bump is disposed within the left side first slot end or the left side second slot end and the left side flexure is not engaged by the left side raised bump when the left brake lever arm is in either the released position or the braked position; and wherein the left side flexure is engaged by the left side raised bump when moving between the released position and the braked position;

wherein the right brake lever arm includes a right side raised bump and wherein the basket assembly includes a right side flexure formed by a right side elongate slot, the right side elongated slot extending from a right side first slot end to a right side second slot end, the right side flexure at least partially extending towards the right brake lever arm axis;

wherein the right side raised bump is disposed within the right side first slot end or the right side second slot end and the right side flexure is not engaged by the right side raised bump when the right brake lever arm is in either the released position or the braked position; and wherein the right side flexure is engaged by the right side raised bump when moving between the released position and the braked position.

2. The wheeled cart of claim 1, wherein the left brake lever arm distal end is attached to the right brake lever arm distal end by a connecting rod extending therebetween.

3. The wheeled cart of claim 2, wherein the basket assembly is configured to collapse to a stored positioned and expand to an opened position.

4. The wheeled cart of claim 3, wherein when the basket assembly is in the opened position and all four wheels are on a ground level, the connecting rod is positioned behind the common rear axis away from the front wheels, where the connecting rod in the released position is higher in relation to the connecting rod in the braked position.

5. The wheeled cart of claim 4, wherein the left brake feature comprises a left brake extension extending outwardly from the left brake lever arm towards the left rear wheel in a direction parallel to the left brake lever arm axis.

6. The wheeled cart of claim 5, wherein the right brake feature comprises a right brake extension extending outwardly from the right brake lever arm towards the right rear wheel in a direction parallel to the right brake lever arm axis.

7. The wheeled cart of claim 6, wherein the left rear wheel is not rotatably connected to the right rear wheel where the left rear wheel rotates independent of the right rear wheel.

8. The wheeled cart of claim 7, wherein the common rear axis comprises a rear axle attached to the basket assembly, where the left rear wheel is rotatably attached to a left end of the rear axle and the right rear wheel is rotatably attached to a right end of the rear axle.

9. The wheeled cart of claim 8, wherein the left front wheel and the right front wheel comprise swivel wheels.

10. The wheeled cart of claim 1, wherein the left brake lever arm axis and the right brake lever arm axis are parallel to the common rear axis.

11. The wheeled cart of claim 1, wherein the left and right brake lever arms are configured to remain in their respective braked positions or released positions until moved to the other positions.

12. The wheeled cart of claim 1, wherein the basket assembly comprises a rectangular floor defining a front edge, a rear edge, a left edge and a right edge, wherein a front wall is pivotably connected to the front edge of the rectangular floor, and wherein a back wall is pivotably connected to the rear edge of the rectangular floor.

13. The wheeled cart of claim 12, wherein in the opened position the front wall and rear wall are perpendicular in relation to the rectangular floor, and wherein in the stored position the front wall is aligned with the rectangular floor and the back wall is adjacent to the rectangular floor.

14. The wheeled cart of claim 13, wherein the basket assembly comprises a left wall pivotably connected at one end to the front wall and pivotably connected at another end to the rear wall, wherein the left wall comprises a first plurality of individual struts.

15. The wheeled cart of claim 14, wherein the basket assembly comprises a right wall pivotably connected at one end to the front wall and pivotably connected at another end to the rear wall, wherein the right wall comprises a second plurality of individual struts.

16. The wheeled cart of claim 15, wherein the basket assembly comprises a U-shaped handle having a middle portion connecting to a left extension and a right extension.

17. The wheeled cart of claim 16, including a left strut pivotably connected at one end to a distal end of the left extension and connected at another end to the left edge of the rectangular floor, and wherein the left extension is pivotably connected to the left wall.

18. The wheeled cart of claim 17, including a right strut pivotably connected at one end to a distal end of the right extension and connected at another end to the right edge of the rectangular floor, and wherein the right extension is pivotably connected to the right wall.

19. A wheeled cart, comprising:
a basket assembly configured to transport a variety of objects placed within;
a left front wheel, a right front wheel, a left rear wheel and a right rear wheel each rotatably attached to the basket assembly, wherein the left rear wheel and the right rear wheel are aligned along a common rear axis;
a brake lever arm pivotably attached to the basket assembly and pivotable about a brake lever arm axis, wherein the brake lever arm includes a brake lever arm distal end extending perpendicularly in relation to the brake lever arm axis, wherein the brake lever arm is configured to be moved by engaging the brake lever arm distal end between a released position and a braked position, wherein the brake lever arm includes a brake feature;
wherein on an inside face of a respective rear wheel of either the left or right rear wheels it includes a plurality of stops radially disposed about the common rear axis;
wherein in the braked position the brake feature is configured to be positioned between at least two of the plurality of stops of the respective rear wheel preventing rotation of the respective rear wheel; and
wherein in the released position the brake feature is configured to be positioned outside the plurality of stops allowing rotation of the respective rear wheel;
wherein the brake lever arm includes a raised bump and wherein the basket assembly includes a flexure formed by an elongated slot, the elongated slot extending from a first slot end to a second slot end, the flexure at least partially extending towards the brake lever arm axis;
wherein the raised bump is disposed within the first slot end or the second slot end and the flexure is not engaged by the raised bump when the brake lever arm is in either the released position or the braked position; and
wherein the flexure is engaged by the raised bump when moving between the released position and the braked position.

* * * * *